United States Patent [19]
Pratt

[11] Patent Number: 4,977,783
[45] Date of Patent: Dec. 18, 1990

[54] LOAD MONITOR

[75] Inventor: Hugh M. O. Pratt, Southampton, United Kingdom

[73] Assignee: Thomas J. Barnes, Sydney, Canada

[21] Appl. No.: 474,653

[22] Filed: Feb. 2, 1990

Related U.S. Application Data

[63] Continuation of Ser. No. 201,561, Jun. 1, 1988, abandoned.

[30] Foreign Application Priority Data

Jun. 1, 1987 [CA] Canada ................................... 538463

[51] Int. Cl.$^5$ .......................... G01L 5/10; G01L 1/12
[52] U.S. Cl. ................................ 73/862.39; 73/862.69
[58] Field of Search ........... 73/862.39, 862.42, 862.44, 73/862.53, 862.54, 862.56, 862.57, 862.65, 862.69, 775, 767, 828, DIG. 2; 338/2, 5; 340/668

[56] References Cited

U.S. PATENT DOCUMENTS

| | | | |
|---|---|---|---|
| 2,550,588 | 4/1951 | Oberholtzer | 73/862.65 |
| 4,283,942 | 8/1981 | Fishfader | 73/862.65 |
| 4,566,339 | 1/1986 | Davidson et al. | 73/773 |
| 4,605,829 | 8/1986 | Zacharias | 73/862.62 |

FOREIGN PATENT DOCUMENTS

| | | | |
|---|---|---|---|
| 897116 | 5/1962 | United Kingdom | 73/862.53 |
| 0903941 | 8/1962 | United Kingdom | 73/862.65 |

Primary Examiner—Charles A. Ruehl
Attorney, Agent, or Firm—Spensley Horn Jubas & Lubitz

[57] ABSTRACT

A load cell for use in load measuring systems. The load cell is comprised of chain links to be secured to a load. A sensor is associated with at least one link of the chain. The sensor is able to measure a load applied to the link.

1 Claim, 1 Drawing Sheet

LOAD MONITOR

This is a continuation of application Ser. No. 201,561 filed on June 1, 1988, now abandoned.

FIELD OF THE INVENTION

This invention relates to load monitoring systems and more particularly to an improved load cell.

DESCRIPTION OF THE PRIOR ART

Load cells are known to come in many shapes and are available for a number of applications with a large range of load capacities. The basic load cell consists of a mechanical link with electronic circuitry able to sense elastic distortion in the mechanical link. Current mechanical links of load monitoring systems allow the cell to be conveniently inserted so that it transmits the load under examination while electronic sensing allows remote reading of the load or stress level being applied to the mechanical link. Such load cells are relatively expensive to manufacture.

It is also very important that the load link system be of guaranteed safety.

SUMMARY OF THE INVENTION

Accordingly, there exists a need for a load cell which is of guaranteed safety and inexpensive.

It is therefore an object of the present invention to provide a load cell comprised of a number of chain links onto which is affixed a sensor able to measure the stress sustained by a chain link while the chain is under load.

A second object of the present invention is to provide a load cell which is comprised of a number of chain links in which at least one chain link is provided with a coil wrapped around one side of a link such that as stress is applied to the chain, the variations of the magnetic properties of the chain link can be measured by the coil, wherein these variations are indicative of the stress level.

Yet another object of the present invention is to provide a load cell consisting of a plurality of links in which a sensor is positioned between a first and adjacent link such that the signal provided by the sensor will be proportional to the amount of compressive load sensed by the sensor as load is applied to the load cell.

Accordingly, an aspect of the present invention is to provide a load cell for use in load measuring systems, comprising: chain link means adapted to be secured to a load; and sensing means adapted to measure from at least one link of said chain link means, a load being applied thereon.

BRIEF DESCRIPTION OF THE DRAWINGS

Particular embodiments of the invention will be understood in conjunction with the accompanying drawings in which.

DESCRIPTION OF THE PREFERRED EMBODIMENTS

Figure 1:
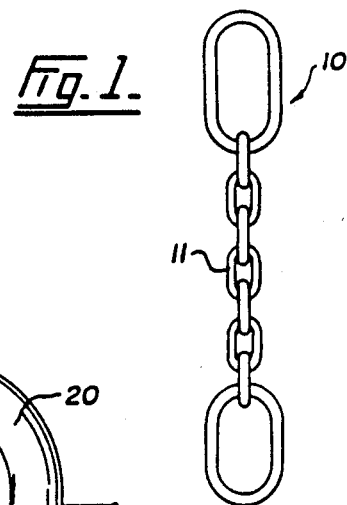
FIG. 1 is an illustrative diagram of a chain link which can be used with the load system of the present invention.

Referring now to FIG. 1, we have shown an illustrative diagram of a series of chain links which can be used to form part of the load cell of the present invention. These links would for example be used between a tug boat and a chain secured to a load which is being towed. Yet another application would be in the logging industry which relies on steel guy wires to move large logs. These wires sometimes break needlessly due to overloading. The chain links shown at reference numeral 10 of FIG. 1 can be secured to a towing chain by any suitable means. Chain links 11 can be standard chain links commercially available in various sizes and load capacities, or specially constructed.

In this invention, the load cell is comprised of the chain links 10 and at least one sensor either positioned on one link, in or between a first and an adjacent link. As tension is applied to the chain link load cell 10, these sensors would register a change in properties of these chain links and therefore be indicative of the measured load.

Figure 2:
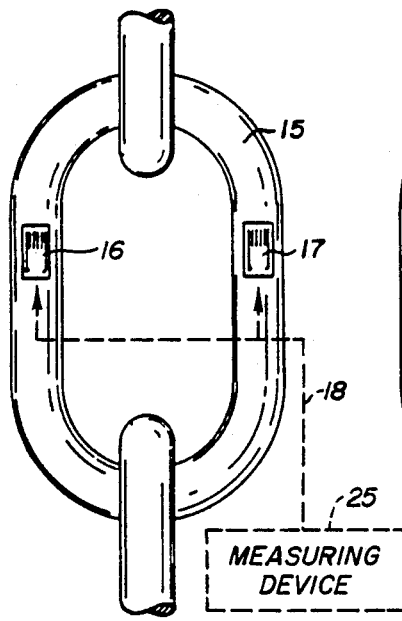
FIG. 2 is an illustrative diagram of a load cell according to a first embodiment of the present invention.

Referring now to FIG. 2 we have shown an enlarged view of a chain link such as shown at reference numeral 11 of FIG. 1. Chain link 15 is provided with strain gauges 16 and 17 on each side of the link. These strain gauges would be connected by a lead (such as that indicated in phantom at 18) to commercially available measuring devices (such as that indicated in phantom at 25) which can be calibrated to be indicative of the load on the chain link.

Figure 3:
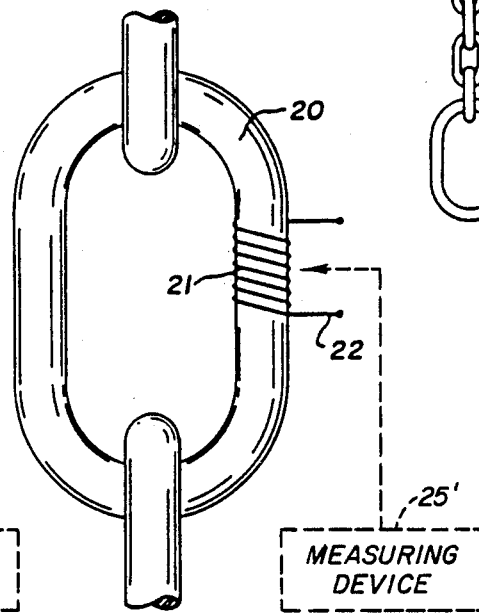
FIG. 3 is an illustrative diagram of a load cell according to a second embodiment of the present invention.

Referring now to FIG. 3, we have shown at reference numeral 20 an enlarged view of a chain link such as shown at reference numeral 11 of FIG. 1. Chain link 20 is provided with a coil 21 wrapped around one side of the link. Output 22 of coil 21 can be connected to commercially available measuring equipment (such as that indicated in phantom 25) which are indicative of the amount of load being applied to chain link 20. This measurement is based on the principle that any metal undergoing deformation will have variations in its electromagnetic properties. Accordingly, a voltage variation across output 22 can be measured as stress is applied to chain link 20.

Figure 4:
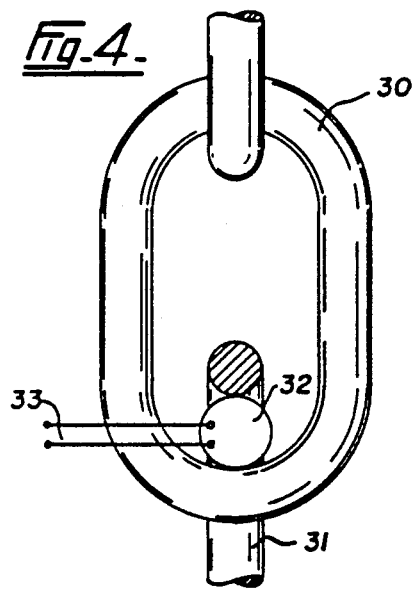
FIG. 4 is an illustrative diagram of a load cell according to a third embodiment of the present invention.

FIG. 4 shows a further embodiment of the present invention. Chain link 30 and an adjacent chain link 31 are provided with a sensor 32 located between each link. The sensor housing has not been shown for clarity. Sensor 32 is provided with output leads 33 which can be connected to commercially available measuring equipment calibrated to be indicative of the load or stress level of chain link 30 and 31. The sensors can either provide variations in voltage or current indicative of the load or stress level being sensed.

Figure 5:
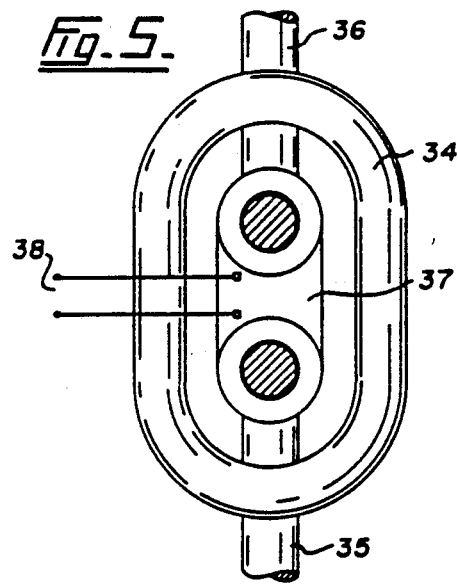
FIG. 5 is an illustative diagram of a load cell according to a fourth embodiment of the present invention.

FIG. 5 shows yet another embodiment of the present invention. Chain link 35 and 36 are joined by a sensor 37. Chain link 34 provides a mechanical fail safe backup system should the sensor break due to overloading. The sensor is not sectioned for clarity. The sensor 37 is provided with output leads 38 which can be connected to commercially available measuring equipment calibrated to indicate the load or stress level of chain link 35 and 36. The sensors can either provide variations in voltage or current indicative of the load or stress level being sensed.

I claim:

1. A load cell for use in load measuring systems, comprising:
   a load receiving chain having a plurality of links;
   load sensing means located on one of said links, for directly sensing the strain on said link;
   a measuring device remote from said sensing means for measuring the load on the link; and
   at least one lead continuously interconnecting the sensing means to the remote measuring device while the sensing means is operated;
   wherein the sensing means comprises a strain gauge located on one side of said one link.

* * * * *